(12) United States Patent
Numata

(10) Patent No.: US 9,307,170 B2
(45) Date of Patent: Apr. 5, 2016

(54) SOLID-STATE IMAGE SENSOR AND RANGE FINDER USING THE SAME

(71) Applicant: CANON KABUSHIKI KAISHA, Tokyo (JP)

(72) Inventor: Aihiko Numata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 14/043,582

(22) Filed: Oct. 1, 2013

(65) Prior Publication Data
US 2014/0118589 A1    May 1, 2014

(30) Foreign Application Priority Data
Nov. 1, 2012   (JP) ................................ 2012-241700

(51) Int. Cl.
*H04N 5/369*    (2011.01)
*G02B 7/28*     (2006.01)

(52) U.S. Cl.
CPC ............... *H04N 5/3696* (2013.01); *G02B 7/28* (2013.01)

(58) Field of Classification Search
CPC ... H04N 5/3696; H04N 5/23212; G02B 7/28; G02B 7/34
USPC ............... 348/335, 345, 348, 349, 302, 294
See application file for complete search history.

(56) References Cited

U.S. PATENT DOCUMENTS

| 8,525,282 B2 * | 9/2013 | Numata et al. ................. 257/432 |
| 2009/0127442 A1 * | 5/2009 | Lee ........................... 250/227.11 |
| 2012/0119068 A1 | 5/2012 | Numata |

FOREIGN PATENT DOCUMENTS

| JP | 2008-91771 A | 4/2008 | |
| JP | 2009-158800 A | 7/2009 | |
| JP | 2012-151215 A | 8/2012 | |
| WO | WO 2010134626 A1 * | 11/2010 | ............ H01L 27/146 |
| WO | 2012/099262 A1 | 7/2012 | |
| WO | WO 2012099262 A1 * | 7/2012 | ............ H01L 27/146 |

* cited by examiner

*Primary Examiner* — Nhan T Tran
(74) *Attorney, Agent, or Firm* — Fitzpatrick, Cella, Harper & Scinto

(57) ABSTRACT

The invention provides a solid-state image sensor including a pixel having a plurality of photoelectric conversion portions and at least one waveguide arranged closer to a side of light incidence than the photoelectric conversion portions, wherein the waveguide has a core member and a cladding member formed of a medium having a refractive index lower than that of the core member, and wherein a layer formed of a medium having a refractive index lower than that of the core member of the waveguide is provided between the photoelectric conversion portions and the waveguide.

15 Claims, 7 Drawing Sheets

SOLID-STATE IMAGE SENSOR AND RANGE FINDER USING THE SAME

BACKGROUND OF THE INVENTION

1. Field of the Invention

The present invention relates to a solid-state image sensor, a range finder using the solid-state image sensor and imaging devices using the range finder, such as a digital still camera and a digital video camera.

2. Description of the Related Art

In a digital still camera or video camera, a distance-detecting technology for AF (automatic focusing) is known. Regarding such a ranging technology for AF, Japanese Patent Application Laid-Open No. 2009-158800 has proposed a solid-state image sensor with a ranging function given to some of pixels thereof so as to conduct detection by a phase difference method. This phase difference method is a method in which light images passed through different regions on a pupil of an imaging optical system are compared to detect an object distance using triangulation by a stereo image. According to this system, there is no need to move a lens for measuring an object distance unlike the conventional contrast system, so that high-speed and high-precision automatic focusing becomes feasible. In addition, upon taking moving images, real-time AF becomes feasible. Japanese Patent Application Laid-Open No. 2009-158800 discloses a solid-state image sensor provided with a waveguide on a plurality of photoelectric conversion portions as a structure of a ranging pixel. Light images passed through different regions on the pupil of the imaging optical system are coupled with different two waveguides using a microlens having an imaging plane at an end surface of the waveguide, whereby they can be guided to different photoelectric conversion portions to measure the object distance.

According to the solid-state image sensor disclosed in Japanese Patent Application Laid-Open No. 2009-158800, however, ranging precision may be deteriorated in some cases when there are a lot of light fluxes incident at a large incident angle on a ranging pixel in a peripheral portion of the solid-state image sensor or in a solid-state image sensor with respect to a luminous imaging optical system. The light flux incident at the large incident angle on the ranging pixel is easily coupled with a higher-order eigenmode in a waveguide and propagates at a guided mode in which an electric field distribution spread in the waveguide to reach a plurality of photoelectric conversion portions in the pixel. Therefore, it is difficult to selectively guide light having passed through each pupil region to different photoelectric conversion portions, and so ranging precision may be deteriorated in some cases.

SUMMARY OF THE INVENTION

The present invention has been made in view of the foregoing problems and has as its object the provision of a technology relating to a solid-state image sensor by which ranging can be conducted with high precision even under such a condition that there are a large number of light fluxes incident at a large angle on a ranging pixel, and high-precision ranging becomes feasible even when a pixel size is small in particular.

According to the present invention, there is provided a solid-state image sensor comprising a pixel having a plurality of photoelectric conversion portions and at least one waveguide arranged close to the side of light incidence than the photoelectric conversion portions, wherein the waveguide has a core member and a cladding member formed of a medium having a refractive index lower than that of the core member, and wherein a layer formed of a medium having a refractive index lower than that of the core member of the waveguide is provided between the photoelectric conversion portions and the waveguide.

According to the present invention, high-precision ranging can be conducted even under such a condition that there are a large number of light fluxes incident at a large incident angle. A solid-state image sensor capable of conducting ranging with high precision even when a pixel size is small in particular can be realized.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In the present invention, at least some of a plurality of pixels formed in the solid-state image sensor is provided as a ranging pixel (a distance-measuring pixel) having a plurality of photoelectric conversion portions and a waveguide formed closer to the side of light incidence than the photoelectric conversion portions. In addition, a layer formed of a medium having a refractive index lower than that of a medium forming a core of the waveguide is provided between the photoelectric conversion portions and the waveguide. High-precision ranging can be conducted by the presence of this layer even under such a condition that there are a large number of light fluxes incident at a large angle on the waveguide.

The solid-state image sensors according to Embodiments of the present invention and a range finder (a distance-measuring apparatus) using them will hereinafter be described with references to the attached drawings. In the following, those having the same function are given the same signs in all drawings, and their repeated descriptions are omitted or simplified.

First Embodiment

Construction of Solid-State Image Sensor

Figure 1:
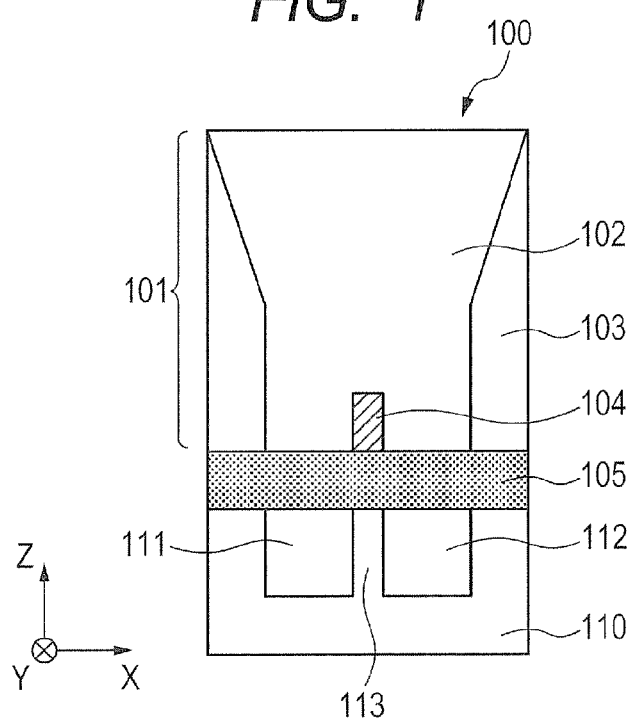
FIG. 1 is a cross-sectional view illustrating a ranging pixel in a solid-state image sensor according to a first embodiment of the present invention.

FIG. 1 schematically illustrates a ranging pixel 100 arranged in a part of a solid-state image sensor according to the first embodiment. The ranging pixel 100 has a waveguide 101 and a substrate 110 from the side of light incidence. The substrate 110 is composed of a material having absorption in a detection wavelength bandwidth, such as Si, and photoelectric conversion portions 111 and 112 converting light to electric charge are formed in at least a partial region of the interior thereof by, for example, ion implantation. An electrode and a wiring portion which are not illustrated are provided in the substrate 110, and electric charges generated in the photoelectric conversion portions 111 and 112 are transferred to a signal processing circuit through wirings. The form of the structure illustrated in FIG. 1 when viewed from the above is, for example, a square or circle, and the forms of the two photoelectric conversion portions 111 and 112 are each a rectangle or semicircle on both sides of a center line dividing the square or circle into halves.

The waveguide 101 is composed of a core 102 and a cladding 103 formed of a medium having a refractive index lower than that of the core 102. A scattering portion 104 which scatters a part of light propagating through the waveguide 101 is provided at an exit end of the core 102. The scattering portion 104 is provided over a separation portion 113 between the photoelectric conversion portion 111 and the photoelectric conversion portion 112. The scattering portion 104 is provided, whereby light incident on the separation portion 113 can be reduced, and light incident on the photoelectric conversion portions 111 and 112 can be increased. A material forming the scattering portion 104 is required to have a refractive index lower than that of a material forming the core 102 which is a surrounding medium. The reason for this is that when the material forming the scattering portion 104 has a refractive index higher than that of the material forming the core 102, light is attracted to the scattering portion 104 with the high refractive index to increase light incident on the separation portion 113.

A layer 105 formed of a medium having a refractive index lower than that of the core 102 is further provided between the waveguide 101 and the substrate 110. In order to realize such a relationship of the refractive indexes, it is only necessary to, for example, form the core 102 of SiN and form the cladding 103, the scattering portion 104 and the layer 105 of $SiO_2$. The layer 105 is provided, whereby a solid-state image sensor capable of conducting ranging with high precision can be realized even when there are a large number of light fluxes incident at a large angle on the ranging pixel 100 increases. The reason for it will hereinafter be described.

Principle of Ranging

Figure 2:
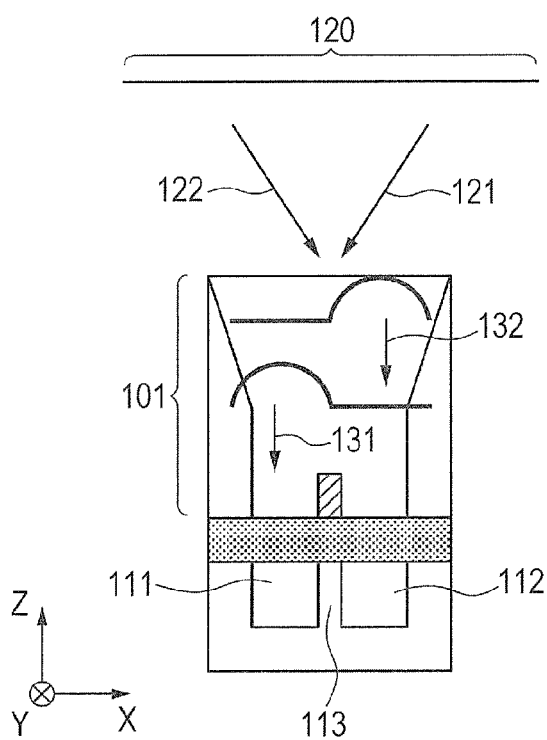
FIG. 2 illustrates a principle of ranging in the ranging pixel.

The principle of ranging using the solid-state image sensor according to the present invention is first described with reference to FIG. 2. Light fluxes having passed through different positions on an exit pupil 120 of an imaging optical system such as a camera lens become light fluxes incident at different angles on the ranging pixel 100. The light fluxes incident at the different angles are converted to different guided modes according to incident angles to the waveguide 101 and propagate in the waveguide 101. The guided mode is expressed by the sum of a plurality of eigenmodes of the waveguide. The eigenmode is uniquely determined by the form and refractive index of the waveguide. The light flux incident on the waveguide is coupled with the plurality of the eigenmodes and propagates. Proportions of the eigenmodes forming the guided mode vary according to the incident angle, and consequently a wave vector of each guided mode differs. A wavenumber component in a direction perpendicular to a direction of propagation generally becomes larger as the mode is higher order, so that such higher order mode propagates slantingly in zigzags.

The form and refractive index of the waveguide 101 are properly designed, whereby light fluxes can be selectively guided to different photoelectric conversion portions, according to the incident angles of the light fluxes. As illustrated in FIG. 2, the waveguide 101 couples a light flux 121 from a +x-side region of an exit pupil mainly with a first-order eigenmode 131 and couples a light flux 122 from a −x-side region mainly with a first-order eigenmode 132. FIG. 2 illustrates a spatial distribution between the eigenmode 131 and the eigenmode 132, in which a straight line portion and a curved portion indicate a small-amplitude region and a large-amplitude region, respectively. The light coupled with the first-order eigenmode 131 straightly propagates through the waveguide 101 to be selectively guided to the photoelectric conversion portion 111. Likewise, the light coupled with the first-order eigenmode 132 is selectively guided to the photoelectric conversion portion 112. An image detected in the photoelectric conversion portion 111 and an image detected in the photoelectric conversion portion 112 are compared by a signal processing unit to detect a distance using a publicly known method.

Reason why Ranging Precision is Improved

Figure 3:
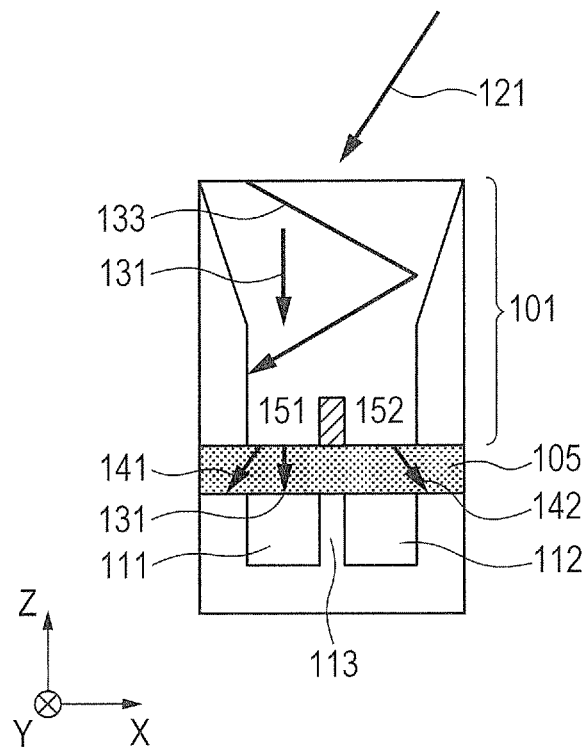
FIG. 3 illustrates propagation of light in a waveguide in the ranging pixel.

The reason why ranging precision is improved by providing the layer 105 having a refractive index lower than that of the core 102 is then described. FIG. 3 illustrates a state of propagation of light in the waveguide 101 when the incident angles of the light fluxes 121 and 122 are large. When the incident angle of the light flux 121 is large, the light flux 121 is incident in such a state that the phase is uneven at an incident end of the waveguide 101, so that the light flux is also coupled with a higher-order eigenmode 133 in addition to the first-order eigenmode 131. As described above, the light coupled with the eigenmode 131 straightly propagates through the waveguide 101 and then straightly enters the layer 105 from a region 151 on the side of the photoelectric conversion portion 111 at an exit end of the waveguide 101. On the other hand, the light coupled with the higher-order eigenmode 133 propagates in zigzags through the waveguide and slantingly enters the layer 105 from the region 151 on the side of the photoelectric conversion portion 111 and a region 152 on the side of the photoelectric conversion portion 112 at the exit end of the waveguide 101. Of the light coupled with the higher-order eigenmode 133, light which exits from the region 151 and light which exits from the region 152 are referred to as light 141 and light 142, respectively.

From the above, the light which is coupled with the eigenmode 131 and straightly propagates and the light 141 which slantingly propagates are incident on the layer 105 from the region 151, and the light 142 which slantingly propagates is incident on the layer 105 from the region 152. The light which is coupled with the eigenmode 131 and straightly propagates straightly propagates through the layer 105 as it is and is guided to the photoelectric conversion portion 111. On the other hand, the light 141 and the light 142 slantingly propagate through the layer 105. At this time, the propagation angle of the lights 141 and 142 which slantingly propagate becomes larger than that within the waveguide in the region 152. The reason for this is that since the refractive index of the layer 105 is lower than that of the core 102, the light incident on the layer 105 from the high refractive index core 102 is refracted in such a manner that the propagation angle becomes large according to the Snell's law. Therefore, the light 141 and the light 142 escape outside the photoelectric conversion portion 111 and the photoelectric conversion portion 112, respectively, to prevent the light 142 from being incident on the photoelectric conversion portion 112. Accordingly, the proportion of the light incident on the photoelectric conversion portion 111 of the light flux 121 relatively increases.

With respect to the light flux 122, the layer 105 is provided, whereby the light coupled with the higher-order mode of the waveguide 101 can be likewise prevented from being incident on the photoelectric conversion portion 111 to selectively guide the light flux 122 to the photoelectric conversion portion 112. As described above, the layer 105 is provided, whereby the light flux 121 and the light flux 122 can be selectively guided to the photoelectric conversion portion 111 and the photoelectric conversion portion 112, respectively, to conduct ranging with high precision. In addition, the characteristic that the guided modes are different is used, whereby light fluxes having passed through different pupil regions can be guided to different photoelectric conversion portions to enable high-precision ranging, even when a pixel is small in particular (in this case, the waveguide becomes finer as the pixel is smaller, so that light slantingly propagates even in the same-order guided mode).

Verification of Effect by Calculation

Figure 4:
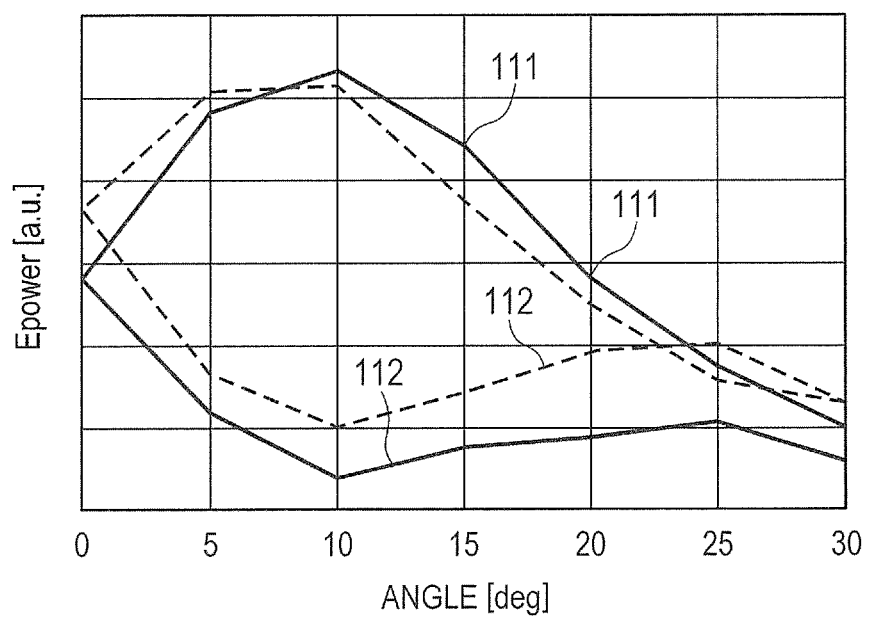
FIG. 4 illustrates a graph explaining a difference in distance-measuring performance according to whether a layer that is a portion characterizing the present invention is present or not.

FIG. 4 illustrates the incident angle dependence of the quantity of light which propagates through the waveguide 101 of the ranging pixel 100 and then is incident on the photoelectric conversion portion 111 and the photoelectric conversion portion 112. The axis of abscissa indicates an incident angle of incident light (supposing light incident slantingly in a positive direction of the x axis like the light flux 121 in FIG. 2), and the axis of coordinate indicates the quantity of light incident on the photoelectric conversion portions 111 and 112. A solid line indicates a case where the layer 105 is provided, and a broken line indicates a case where the layer 105 is not provided. It is understood from FIG. 4 that regarding a light flux incident at a large angle in particular, the quantity of light incident on the photoelectric conversion portion 112 is reduced by providing the layer 105. That is, a proportion of light selectively incident on the photoelectric conversion portion 111 increases. The reason for this is that light coupled with the higher-order eigenmode 133 is prevented from being incident on the photoelectric conversion portion 112 by the layer 105. When light incident slantingly in a negative direction of the x axis like the light flux 122 in FIG. 2 is supposed, the quantity of light incident on the photoelectric conversion portion 111 is reduced by the same reason, and the proportion of light selectively incident on the photoelectric conversion portion 112 increases.

Thickness of Low Refractive Index Layer

Figure 5A:
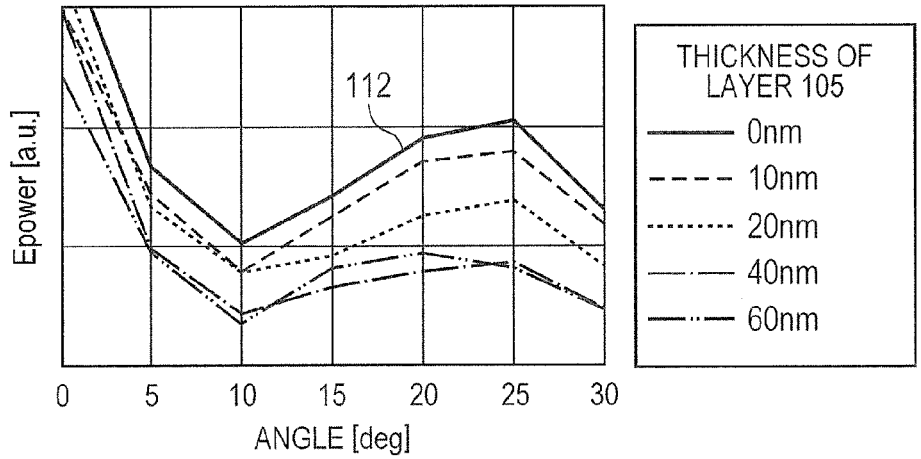
FIG. 5A illustrates a graph explaining a difference in distance-measuring performance according to the thickness of the layer.
Figure 5B:
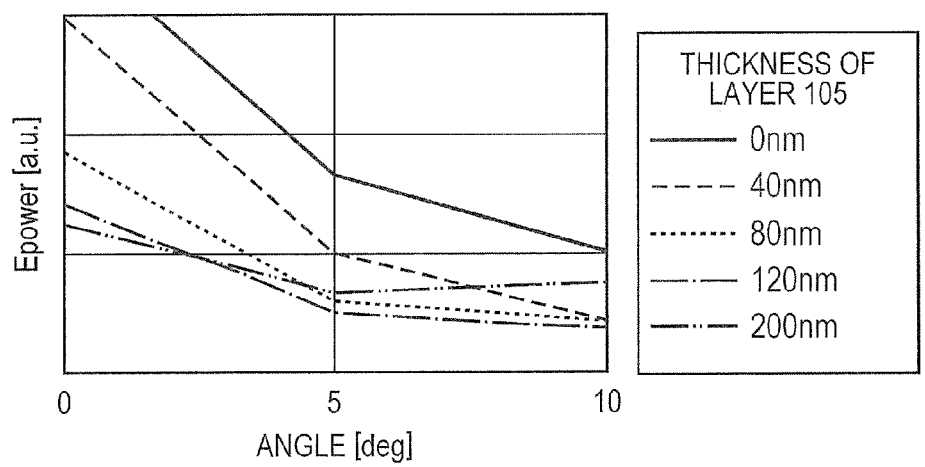
FIG. 5B illustrates another graph explaining a difference in distance-measuring performance according to the thickness of the layer.

In order to prevent the light 142 from being incident on the photoelectric conversion portion 112 by the layer 105, the thickness of the layer 105 is favorably thicker. FIG. 5A and FIG. 5B illustrate the dependence of the quantity of light incident on the photoelectric conversion portion 112 on the thickness of the layer 105. As apparent from FIG. 5A, the quantity of light incident on the photoelectric conversion portion 112 when the incident angle of the light flux 121 is relatively large can be reduced when the thickness of the layer 105 is 40 nm or more, so that high-precision ranging becomes feasible. As apparent from FIG. 5B, the quantity of light incident on the photoelectric conversion portion 112 can be reduced when the thickness of the layer 105 is 120 nm or more even when the incident angle of the light flux 121 is relatively small. Thus, the thickness of the layer 105 is more favorably 120 nm or more. When light incident slantingly in a negative direction of the x axis like the light flux 122 in FIG. 2 is supposed, the quantity of light incident on the photoelectric conversion portion 111 is reduced by the same reason, and the proportion of light selectively incident on the photoelectric conversion portion 112 increases. In addition, the layer 105 may be a multi-layer structure formed form a plurality of media. When the layer 105 is the multi-layer structure, it is only necessary that the average refractive index of the entire layer 105 is lower than the average refractive index of the core 102.

Change in Layer Thickness Between Center Portion and Peripheral Portion

When a plurality of ranging pixels 100 are arranged, the layer 105 may be provided in only a ranging pixel located at a peripheral portion of the solid-state image sensor. The reason for this is that since the incident angle of a light flux incident on the ranging pixel 100 at the peripheral portion of the solid-state image sensor is larger than that at the center portion of the solid-state image sensor, the effect of improving ranging precision by the layer 105 becomes great. The thickness of the layer 105 in the ranging pixel located at the peripheral portion may be thicker than that in the ranging pixel located at the center portion by the same reason. However, the thickness of the layer 105 is favorably the same in all the ranging pixels from the viewpoint of a production process which will be described subsequently.

Arrangement of Ranging Pixel

When ranging pixels 100 are arranged as all pixels of the solid-state image sensor, signals obtained by the photoelectric conversion portions 111 and 112 included in the ranging pixels can be integrated and used as image signals of an imaging image. The respective ranging pixels 100 may be discretely arranged to provide an imaging pixel between them. At this time, a signal obtained by the imaging pixel may be used to form an image signal of a ranging pixel close thereto. Some of the plural ranging pixels may be provided as such a pixel that the structure of the ranging pixel illustrated in FIG. 1 is rotated by 90 degrees around the z axis to conduct ranging by dividing an exit pupil in a direction of the y axis. In a pixel in which an exit pupil is divided in a direction of the x axis, ranging of an object having contrast in the direction of the x axis becomes feasible, while in a pixel in which an exit pupil is divided in a direction of the y axis, ranging of an object having contrast in the direction of the y axis becomes feasible.

Taper, Microlens and Color Filter

In the ranging pixel illustrated in FIG. 1, the scattering portion 104 is provided in the waveguide. However, the scattering portion 104 may not be provided. However, it is better to provide the scattering portion 104 because light incident on the separation portion 113 can be reduced. Incidentally, the core 102 of the waveguide desirably has such a tapered form that the diameter thereof increases toward the incident end. It is favorable in three points that the core 102 is tapered because a light flux incident on the pixel can be efficiently guided to the core 102 of the waveguide. First, the quantity of light incident on the photoelectric conversion portions 111 and 112 increases to improve the S/N ratio of an image. Second, a space where a wiring (not illustrated) is provided can be ensured in the cladding 103 between pixels. Third, a region in which light propagates can be limited to a specific region of a pixel to reduce cross talk caused by leakage of light into an adjoining pixel.

Figure 6:
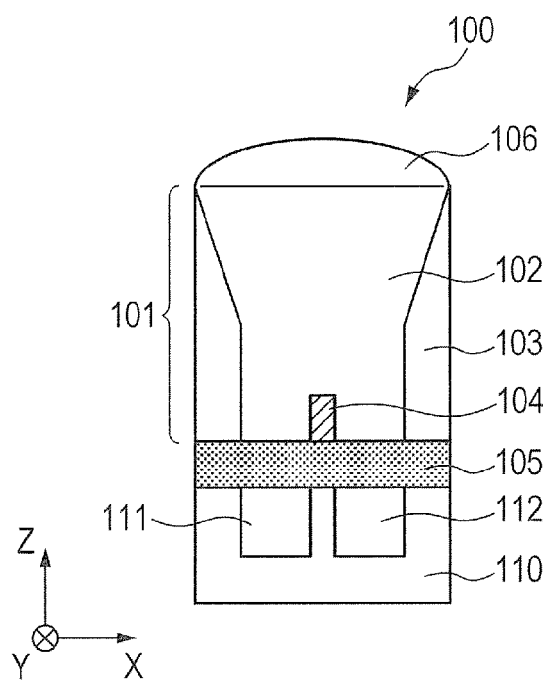
FIG. 6 is a cross-sectional view illustrating a modified ranging pixel in the solid-state image sensor according to the first embodiment.

In addition, a microlens 106 may also be provided on the top of the waveguide 101 as illustrated in FIG. 6. The microlens 106 is provided, whereby a light flux incident on the pixel can be more efficiently guided to the core 102 of the waveguide. A color filter may also be provided in each pixel. The wavelength bandwidth of light incident on the waveguide can be thereby limited, and so the incident light is easily allowed to propagate at a desired guided mode, whereby light fluxes from different pupil regions can be more selectively guided to different photoelectric conversion portions. Incidentally, two photoelectric conversion portions are provided in the ranging pixel 100 in FIG. 1. However, three or more photoelectric conversion portions may also be provided. For example, four photoelectric conversion portions divided into halves in directions of the x axis and the y axis are used, whereby pupil division in the directions of the x axis and the y axis can be conducted in the same pixel. The exit pupil 120 can be more minutely divided to conduct ranging with higher precision. When the scattering portion 104 is provided in this construction, the scattering portion 104 is formed according to the pattern of the separation portion 113 when viewed from the above.

Production Process

Figure 7A:
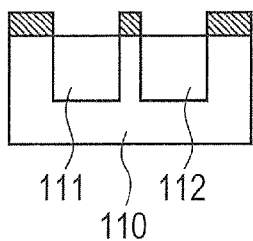
FIGS. 7A, 7B and 7C are cross-sectional views illustrating a process for producing the solid-state image sensor according to the first embodiment.
Figure 7B:
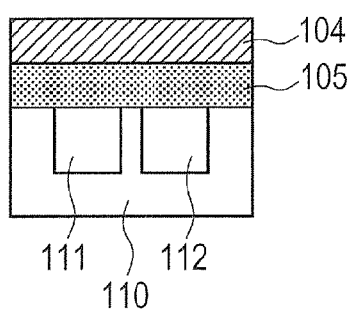
Figure 7C:
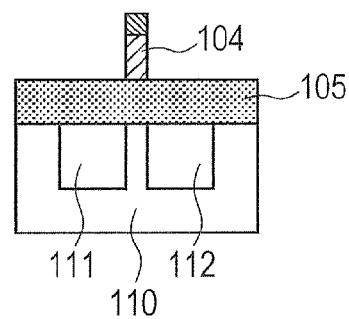

A production process of the ranging pixel 100 in the solid-state image sensor will now be described with reference to FIGS. 7A to 7C. As illustrated in FIG. 7A, a resist covering other portions than portions where photoelectric conversion portions are formed is first prepared on a substrate (silicon) 110 by photolithography, and photoelectric conversion portions 111 and 112 are prepared by ion implantation. After the resist is removed by ashing, a layer ($SiO_2$) 105 and a portion ($SiO_2$) which will become a scattering portion 104 subsequently are formed on the substrate by, for example, sputtering as illustrated in FIG. 7B. The scattering portion 104 is then prepared by photolithography and dry etching as illustrated in FIG. 7C. The resist is then removed by ashing. Thereafter, a process for forming a waveguide and a wiring may be conducted by using a publicly known process described in Japanese Patent Application Laid-Open No. 2009-158800. A core 102 of the waveguide may be formed by using SiN having a refractive index higher than that of $SiO_2$ forming the layer 105 and the scattering portion 104.

Range Finder and Imaging Device

Figure 8:
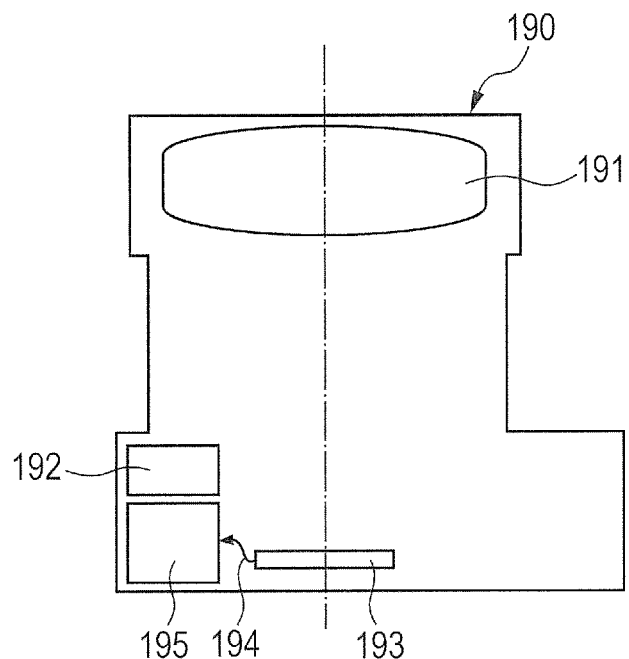
FIG. 8 illustrates a range finder or imaging device using the solid-state image sensor according to the first embodiment.

A range finder 190 using the solid-state image sensor according to the present invention is illustrated in FIG. 8. The range finder 190 has an optical system 191 forming an image of an object on the solid-state image sensor, a CPU 192 for control, a solid-state image sensor 193 having a ranging pixel 100, a wiring 194 and a signal processing unit 195. Signals obtained in the photoelectric conversion portion 111 and the photoelectric conversion portion 112 are transferred by the wiring 194, and output signals of respective images are compared in the signal processing unit 195 to obtain distance information of the object, thereby conducting ranging. When a display device for displaying the image obtained by the solid-state image sensor, a shutter mechanism and a memory for storing a constant, a variable and various programs for operation of a system control unit are provided in addition to the above-described components, the device illustrated in FIG. 8 can also be provided as an imaging device such as a camera. In such a camera, the object image formed by the optical system can also be obtained by the solid-state image sensor 193 of the range finder.

Second Embodiment

Scattering Portion Located in Low Refractive Index Layer

Figure 9:
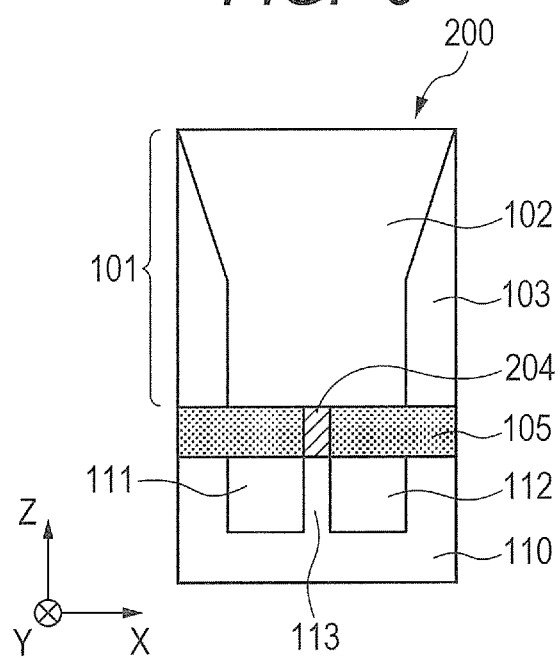
FIG. 9 is a cross-sectional view illustrating a ranging pixel in a solid-state image sensor according to a second embodiment of the present invention.

FIG. 9 schematically illustrates a ranging pixel 200 arranged in a part of a solid-state image sensor according to the second embodiment. The ranging pixel 200 is different from the ranging pixel 100 according to the first embodiment in that a scattering portion 204 is located in a layer 105. In addition, a material forming the scattering portion 204 has a refractive index lower than that of a material surrounding the scattering portion 204. For example, a core 102 may be formed of SiN, a cladding and another portion of the layer 105 than the scattering portion 204 may be formed of SiON, and the scattering portion 204 may be formed of $SiO_2$.

Advantage and Reason for it

The scattering portion 204 is more favorably provided in the layer 105 because sensitivity is improved in addition to the improvement of ranging precision. The reason for it is described. When a scattering portion is provided in the waveguide 101, the width of the core 102 becomes narrow beside the scattering portion. Therefore, light propagating through the waveguide 101 is confined in a narrow region and spread by diffraction at an exit end to be incident on the layer 105. Thus, the quantity of light incident on the photoelectric conversion portion 111 and the photoelectric conversion portion 112 is reduced. On the other hand, when the scattering layer 204 is provided in the layer 105, the width of the core 102 remains large. Thus, diffraction at the exit end of the waveguide 101 does not occur so much, and the light is straightly incident on the layer 105. The light incident on the layer 105 causes diffraction at the scattering portion 204. However, the degree thereof is small compared with the influence by the scattering portion in the waveguide 101. The reason for it will hereinafter be described.

The layer 105 does not have portions such as the core 102 and the cladding 103 which are different in refractive index, unlike the waveguide 101, and the refractive index of the layer 105 is lower than that of the core 102. Thus, light is not confined in a narrow region compared with the case where the scattering portion is provided in the waveguide 101. Accordingly, the spread of light by diffraction is smaller in the case where the scattering portion 204 is provided in the layer 105 than the case where the scattering portion is provided in the waveguide 101. From the above-described reason, the scattering portion 204 is favorably provided in the layer 105. Incidentally, when the scattering portion 204 is provided in the layer 105, the material forming the scattering portion 204 is required to have a refractive index lower than that of the material surrounding the scattering portion 204 of the layer 105. If a material having a refractive index higher than that of the material surrounding the scattering portion 204 of the layer 105 is used as the material forming the scattering portion 204, light incident on the layer 105 from the waveguide 101 is attracted to the scattering portion 204 to increase light incident on the separation portion 113.

Verification of Effect by Calculation

Figure 10:
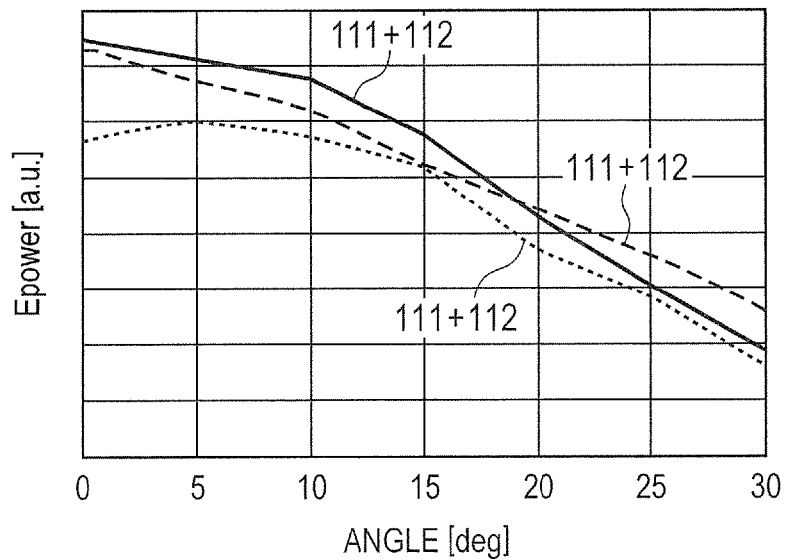
FIG. 10 illustrates a graph explaining a difference in sensitivity according to the position of a scattering portion.

FIG. 10 illustrates the sum of quantities of light incident on the photoelectric conversion portion 111 and the photoelectric conversion portion 112 (corresponding to sensitivity) in the ranging pixel 200. The axis of abscissa indicates an incident angle of incident light, and the axis of coordinate indicates the quantities of light incident on the photoelectric conversion portions. A solid line indicates the ranging pixel according to this embodiment, a dotted line indicates the ranging pixel according to the first embodiment, and a broken line indicates a case where the layer 105 is not provided as also illustrated in FIG. 4 as a Comparative Example. It is understood from FIG. 10 that the quantities of the incident light are increased by providing the scattering portion 204 in the layer 105 compared with the case where the scattering portion 104 is provided in the waveguide 101. The sensitivity of the ranging pixel 200 is almost the same as in the case where the layer 105 is not provided as illustrated as the Comparative Example, and is higher in the ranging pixel 200 when the incident angle is small in particular. The reason for this is that the spread of light by diffraction is smaller in the case where the scattering portion 204 is provided in the layer 105 than the case where the scattering portion is provided in the waveguide 101 as described above.

From the above, the ranging pixel 200 is more favorably constructed in the following manner because a solid-state image sensor with both improved ranging precision and sensitivity can be provided. That is, a layer 105 formed of a medium having a refractive index lower than that of the core 102 is provided between the waveguide 101 and the substrate 110, and a scattering portion 204 formed of a medium having a refractive index lower than that of a material surrounding the scattering portion 204 is provided in the layer 105.

Shape of Scattering Portion

Figure 11:
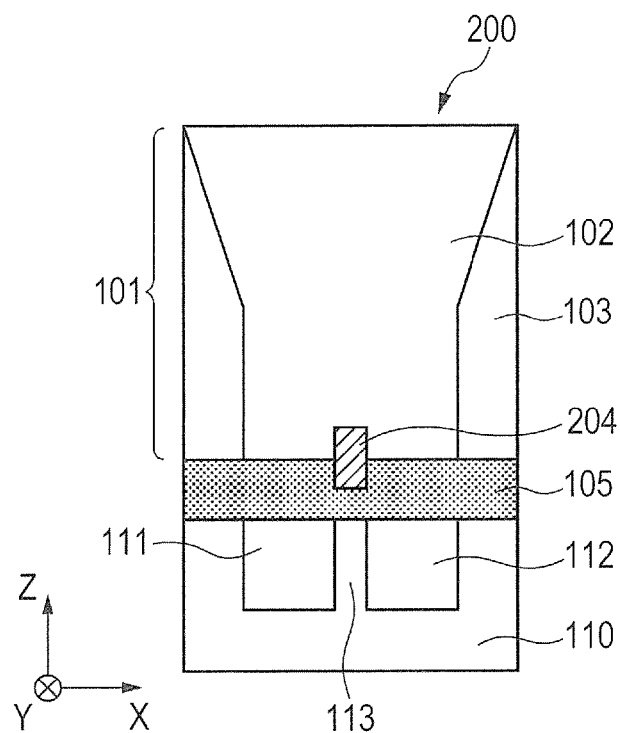
FIG. 11 is a cross-sectional view illustrating a modified ranging pixel in the solid-state image sensor according to a second embodiment.

If the width of the scattering portion is narrow, light incident on the separation portion 113 cannot be sufficiently scattered, while if wide, light incident on the photoelectric conversion portions 111 and 112 is attenuated. The width is favorably of the order of 0.1 times or more and 2 times or less as much as a detection wavelength. The height of the scattering portion is favorably 0.1 times or more as much as the detection wavelength for obtaining sufficient scattering intensity. Incidentally, the scattering portion 204 is not always completely included in the layer 105 and may extend over the layer 105 and the waveguide 101 as illustrated in FIG. 11. That is, it is only necessary that at least a part of the scattering portion 204 is included in the layer 105. A lower portion of the scattering portion 204 is favorably closer to the substrate 110 because the sensitivity is improved. The reason for it is that when the scattering portion 204 is closer to the substrate 110, a place where diffraction occurs becomes close to an upper surface of the substrate 110, and so light is incident on the substrate before the light is spread by diffraction.

Figure 12:
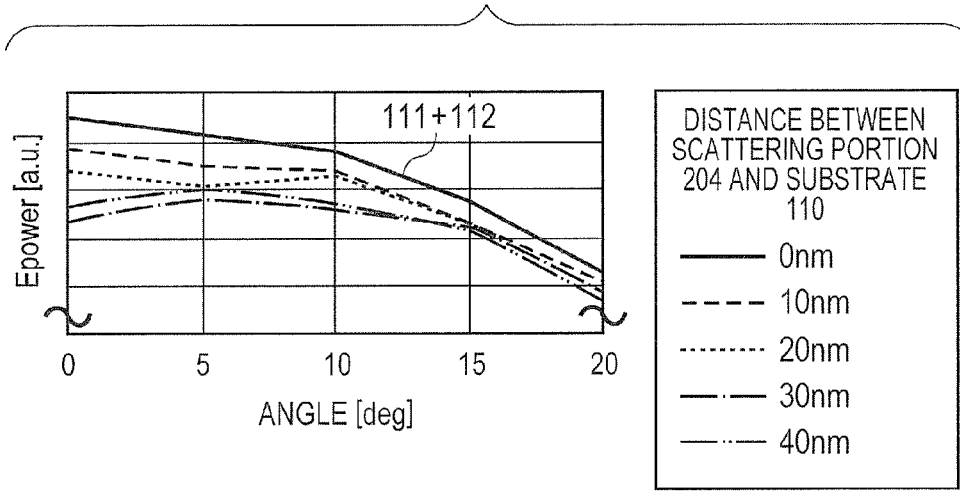
FIG. 12 illustrates a graph explaining a difference in sensitivity according to a distance between the scattering portion and a substrate.

FIG. 12 illustrates dependence of the sum of quantities of light incident on the photoelectric conversion portion 111 and the photoelectric conversion portion 112 on a distance between a lower surface of the scattering portion 204 and an upper surface of the substrate 110. From FIG. 12, the distance between the lower surface of the scattering portion 204 and the upper surface of the substrate 110 (that is, a distance between the scattering portion and the separation portion) is favorably 20 nm or less. When a plurality of ranging pixels 200 are provided in the solid-state image sensor, the shape of the scattering portion 204 may be changed for every pixel. For example, since angles of incident light fluxes are different between a center portion and a peripheral portion of the solid-state image sensor, the shape of the scattering portion 204 is changed according to such a difference, whereby distance-measuring performance and sensitivity can be improved. Specifically, in a pixel at a peripheral portion of the solid-state image sensor, the shape (at least one of width and height) of the scattering portion 204 is made large, whereby the distance-measuring performance with respect to a light flux with a large in incidence angle may be improved. In a pixel at a center portion of the solid-state image sensor on the other hand, the shape of the scattering portion 204 is made small, whereby the sensitivity with respect to a light flux with a small incidence angle may be improved. The same may apply to the case where the scattering portion 104 is provided in the waveguide 101 like the first embodiment.

Self-Alignment Process

When the scattering portion 204 is provided at the lowest portion of the layer 105 in particular, a production process with self-alignment which will be described subsequently is used, whereby positional deviation between the scattering portion 204 and the separation portion 113 can be prevented. Less positional deviation between the scattering portion 204 and the separation portion 113 is favorable, because light incident on the separation portion 113 can be reduced.

Figure 13A:
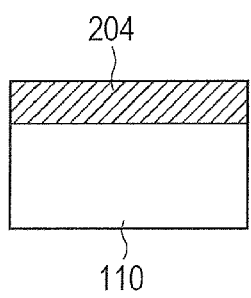
FIGS. 13A, 13B, 13C, 13D and 13E are cross-sectional views illustrating a process for producing the solid-state image sensor according to the second embodiment.
Figure 13B:
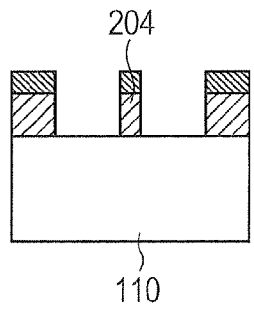
Figure 13C:
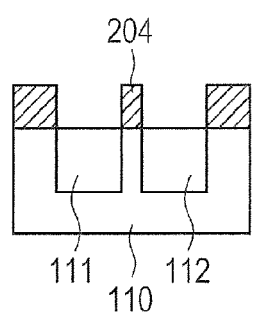

A process for producing the ranging pixel 200 is specifically described with reference to FIGS. 13A to 13E. As illustrated in FIG. 13A, a film (a first material, for example, $SiO_2$) which will become a scattering portion 204 subsequently is first formed up to a height of the scattering portion 204 on a substrate (silicon) 110 by, for example, sputtering. As illustrated in FIG. 13B, portions where photoelectric conversion portions 111 and 112 will be formed subsequently are then exposed by photolithography and dry etching to provide opening portions (removal step). As illustrated in FIG. 13C, the photoelectric conversion portions 111 and 112 are then formed by ion implantation, and a resist is removed by asking (implantation step). By this step, the scattering portion 204 is formed just on a separation portion 113. In the production process illustrated in FIGS. 7A to 7C, the resist pattern (FIG. 7A) for forming the photoelectric conversion portions 111 and 112 is different from the resist pattern (FIG. 7C) for forming the scattering portion 104, so that alignment has been required. However, the scattering portion 204 is used as a mask for forming the photoelectric conversion portions 111 and 112 as illustrated in FIGS. 13A to 13E, whereby the scattering portion 204 and the separation portion 113 can be formed without positional deviation without conducting high-precision alignment.

Figure 13D:
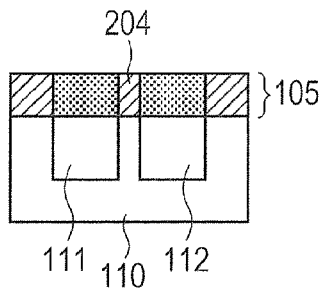
Figure 13E:
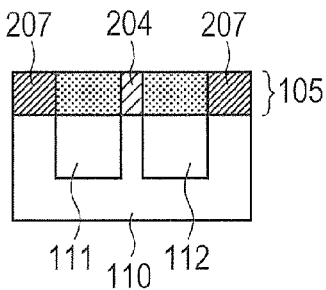

As illustrated in FIG. 13D, a layer 105 is then formed of a material (a second material having a refractive index higher than that of the first material, for example, SiON) by, for example, sputtering and flattened by, for example, CMP (embedding step). Incidentally, as apparent from FIG. 13D, portions located outside the photoelectric conversion portions 111 and 112 in the layer 105 are formed of the same material ($SiO_2$) as that of the scattering portion 204 when this production process is used. As described above, the layer 105 may not be always formed of the same material as far as the layer is formed of materials having a refractive index lower than that of the material forming the core 102. In addition, it is only necessary that the refractive index of the material forming the scattering portion 204 is lower than that of a material surrounding the scattering portion 204. In the production process illustrated in FIGS. 13A to 13E, the layer 105 is formed of $SiO_2$ and SiON, and the scattering portion is formed of $SiO_2$. Accordingly, it is only necessary to form the core 102 of a material having a refractive index higher than those of both $SiO_2$ and SiON, such as SiN.

Incidentally, a light absorption portion 207 may also be provided at portions corresponding to portions located outside the photoelectric conversion portions 111 and 112 in the layer 105 by photolithography and dry etching which are conducted again, asking, film formation, and CMP. The light absorption portion 207 is formed of, for example, an organic material or metal. Light 142 which is coupled with the higher-order eigenmode 133 of the waveguide 101 and incident on the layer 105 from the region 152 is prevented by the absorption portion 207 from being incident on an adjoining pixel to become noise. Alignment precision required between the absorption portion 207 and the photoelectric conversion portions 111 and 112 is small compared with alignment precision required between the scattering portion 204 and the separation portion 113. Accordingly, it is favorable that the scattering portion 204 is formed by the production process with self-alignment, and the absorption portion 207 is formed by plural times of photolithography using alignment. Incidentally, the absorption portion 207 is also contained in the layer 105 and hence is required to be formed of a material having a refractive index lower than that of the core 102. Thereafter, a process for forming a waveguide and a wiring may be conducted by using a publicly known process described in Japanese Patent Application Laid-Open No. 2009-158800.

When a plurality of ranging pixels 200 are provided in the solid-state image sensor, the shape of the absorption portion 207 may be changed for every pixel. For example, since angles of incident light fluxes are different between a center portion and a peripheral portion of the solid-state image sensor, the shape of the absorption portion 207 is changed according to such a difference, whereby distance-measuring performance and sensitivity can be improved. Specifically, in a pixel at a peripheral portion of the solid-state image sensor, the shape of the absorption portion 207 is made large, whereby the distance-measuring performance with respect to a light flux with a large incidence angle may be improved. In a pixel at a center portion of the solid-state image sensor on the other hand, the shape of the absorption portion 207 is made small, whereby the sensitivity with respect to a light flux with a small incidence angle may be improved.

Although the favorable embodiments of the present invention have been described above, the present invention is not limited to these embodiments, and various modifications and changed may be made within the scope of the gist thereof. The above-described solid-state image sensors according to the present invention can be used in range finders and in imaging devices such as cameras requiring a range finder. At that time, it is only necessary to suitably position the solid-state image sensor with respect to an optical system forming an image of an object according to the construction thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-241700, filed Nov. 1, 2012 which is hereby incorporated by reference herein in its entirety.

What is claimed is:

1. A solid-state image sensor comprising:
   a pixel including a plurality of photoelectric conversion portions and a waveguide arranged closer to a side of light incidence than the photoelectric conversion portions, wherein
   the waveguide comprises a core member and a cladding member formed of a medium having a refractive index lower than that of the core member, and
   a layer provided between the photoelectric conversion portions and the waveguide and propagating light that exits from the waveguide, said layer being formed of a medium having a refractive index lower than that of the core member, and having a larger thickness in a pixel located at a peripheral portion of the solid-state image sensor than in a pixel located at a center portion of the solid-state image sensor.

2. A range finder comprising the solid-state image sensor according to claim 1, and
   a signal processing unit for obtaining distance information of an object by using a plurality of output signals from the plurality of the photoelectric conversion portions.

3. An imaging device comprising the range finder according to claim 2 and an optical system for forming an image of an object on the solid-state image sensor.

4. A solid-state image sensor comprising:
   a pixel including a plurality of photoelectric conversion portions and a waveguide arranged closer to a side of light incidence than the photoelectric conversion portions; and
   a scattering portion formed of a medium having a refractive index lower than that of a surrounding medium provided at a position opposed to a region between the plurality of the photoelectric conversion portions, wherein
   the waveguide comprises a core member and a cladding member formed of a medium having a refractive index lower than that of the core member,
   a layer provided between the photoelectric conversion portions and the waveguide and propagating light that exits from the waveguide, said layer being formed of a medium having a refractive index lower than that of the core member, and
   the scattering portion has a larger size in a pixel located at a peripheral portion of the solid-state image sensor than in a pixel located at a center portion of the solid-state image sensor.

5. A range finder comprising the solid-state image sensor according to claim 4, and
   a signal processing unit for obtaining distance information of an object by using a plurality of output signals from the plurality of the photoelectric conversion portions.

6. An imaging device comprising the range finder according to claim 5 and an optical system for forming an image of an object on the solid-state image sensor.

7. A solid-state image sensor comprising:
   a pixel including a plurality of photoelectric conversion portions and a waveguide arranged closer to a side of light incidence than the photoelectric conversion portions; and
   a light absorption portion formed at a portion corresponding to a portion located outside the photoelectric conversion portions, wherein
   the waveguide comprises a core member and a cladding member formed of a medium having a refractive index lower than that of the core member,
   a layer provided between the photoelectric conversion portions and the waveguide and propagating light that exits from the waveguide, said layer being formed of a medium having a refractive index lower than that of the core member, and the light absorption portion has a larger size in a pixel located at a peripheral portion of the solid-state image sensor than in a pixel located at a center portion of the solid-state image sensor.

8. A range finder comprising the solid-state image sensor according to claim 7, and
a signal processing unit for obtaining distance information of an object by using a plurality of output signals from the plurality of the photoelectric conversion portions.

9. An imaging device comprising the range finder according to claim 8 and an optical system for forming an image of an object on the solid-state image sensor.

10. A solid-state image sensor comprising a pixel including a plurality of photoelectric conversion portions and a waveguide arranged closer to a side of light incidence than the photoelectric conversion portions, wherein
the waveguide includes a core member and a cladding member formed of a medium having a refractive index lower than that of the core member,
a layer formed of a medium having a refractive index lower than that of the core member is provided between the photoelectric conversion portions and the waveguide,
a scattering portion formed of a medium having a refractive index lower than that of a surrounding medium is provided at a position surrounded by at least one of the layer and the core, the position being opposed to a region between the plurality of the photoelectric conversion portions, and
a plurality of exit ends of the core contact the layer, the plurality of the exit ends being divided from each other by the scattering portion.

11. A range finder comprising the solid-state image sensor according to claim 10, and
a signal processing unit for obtaining distance information of an object by using a plurality of output signals from the plurality of the photoelectric conversion portions.

12. An imaging device comprising the range finder according to claim 11 and an optical system for forming an image of an object on the solid-state image sensor.

13. The solid-state image sensor according to claim 10, wherein the layer has a larger thickness in a pixel located at a peripheral portion of the solid-state image sensor than in a pixel located at a center portion of the solid-state image sensor.

14. The solid-state image sensor according to claim 10, wherein the scattering portion has a larger size in a pixel located at a peripheral portion of the solid-state image sensor than in a pixel located at a center portion of the solid-state image sensor.

15. The solid-state image sensor according to claim 10, wherein a light absorption portion is formed at a portion corresponding to a portion located outside the photoelectric conversion portions, and
the light absorption portion has a larger size in a pixel located at a peripheral portion of the solid-state image sensor than in a pixel located at a center portion of the solid-state image sensor.

* * * * *